(12) United States Patent
Wend

(10) Patent No.: US 10,124,957 B2
(45) Date of Patent: Nov. 13, 2018

(54) SHELF STORAGE AND RETRIEVAL SYSTEM FOR A SHELF WAREHOUSE, SHELF WAREHOUSE WITH A SHELF STORAGE AND RETRIEVAL SYSTEM OF THIS TYPE AND METHOD FOR STORING/RETRIEVING CLOTHES RAILS IN OR FROM A SHELF WAREHOUSE OF THIS TYPE

(71) Applicant: Dürkopp Fördertechnik GmbH, Bielefeld (DE)

(72) Inventor: Michael Wend, Bielefeld (DE)

(73) Assignee: DÜRKOPP FÖRDERTECHNIK GMBH, Bielefeld (DE)

( * ) Notice: Subject to any disclaimer, the term of this patent is extended or adjusted under 35 U.S.C. 154(b) by 133 days.

(21) Appl. No.: 14/669,404

(22) Filed: Mar. 26, 2015

(65) Prior Publication Data

US 2015/0274446 A1     Oct. 1, 2015

(30) Foreign Application Priority Data

Mar. 26, 2014   (DE) ........................ 10 2014 205 583

(51) Int. Cl.
*B65G 1/04*    (2006.01)
*B65G 25/02*   (2006.01)

(52) U.S. Cl.
CPC ......... *B65G 1/0442* (2013.01); *B65G 1/0457* (2013.01); *B65G 25/02* (2013.01); *B65G 2201/0229* (2013.01)

(58) Field of Classification Search
CPC ................ B65G 1/0442; B65G 1/0457; B65G 2201/0229

USPC ................... 414/22.62, 282, 745.6
See application file for complete search history.

(56) References Cited

U.S. PATENT DOCUMENTS

| 3,741,419 A * | 6/1973 | Bergerhoff | B65G 1/0442 414/282 |
|---|---|---|---|
| 4,252,486 A * | 2/1981 | Soligno | B65G 1/0442 414/282 |
| 4,364,706 A | 12/1982 | Kranzlmuller | |
| 4,406,570 A * | 9/1983 | Duncan | B65G 1/0442 414/282 |

(Continued)

FOREIGN PATENT DOCUMENTS

| DE | 29715506 U1 | 10/1997 |
|---|---|---|
| DE | 102007013863 A1 | 9/2008 |

(Continued)

OTHER PUBLICATIONS

European search report dated Jul. 28, 2015, in corresponding EP application No. 15159343.1.

*Primary Examiner* — James Keenan
(74) *Attorney, Agent, or Firm* — Browdy and Neimark, P.L.L.C.

(57) ABSTRACT

A shelf warehouse comprises a loading/unloading station, at least one shelf and a shelf storage and retrieval system that can be moved between the loading/unloading station and the shelf. The shelf storage and retrieval system has a load receiving device with a transfer device that can be moved along a transfer direction to transfer clothes rails and with a plurality of vertically movable lifting mechanisms arranged on the transfer device for lifting a respective clothes rail from below.

14 Claims, 9 Drawing Sheets

(56) References Cited

U.S. PATENT DOCUMENTS

| | | | | |
|---|---|---|---|---|
| 5,354,169 A | * | 10/1994 | Washio | B65G 1/0442 |
| | | | | 414/281 |
| 5,366,335 A | * | 11/1994 | Tokiwa | B65G 1/0442 |
| | | | | 414/282 |
| 6,179,541 B1 | * | 1/2001 | Rioux | B65G 1/0442 |
| | | | | 414/282 |
| 6,558,102 B2 | * | 5/2003 | Klein | B65G 1/0457 |
| | | | | 414/282 |

FOREIGN PATENT DOCUMENTS

| | | |
|---|---|---|
| DE | 102008025778 A1 | 12/2009 |
| EP | 0899217 A1 | 3/1999 |
| EP | 1106537 A1 | 6/2001 |
| EP | 2130789 B1 | 1/2011 |
| NL | 7700051 A | 8/1977 |

* cited by examiner

SHELF STORAGE AND RETRIEVAL SYSTEM FOR A SHELF WAREHOUSE, SHELF WAREHOUSE WITH A SHELF STORAGE AND RETRIEVAL SYSTEM OF THIS TYPE AND METHOD FOR STORING/RETRIEVING CLOTHES RAILS IN OR FROM A SHELF WAREHOUSE OF THIS TYPE

CROSS-REFERENCE TO RELATED APPLICATIONS

This application claims the priority of German Patent Application, Serial No. 10 2014 205 583.0, filed on 26 Mar. 2014, pursuant to 35 U.S.C. 119(a)-(d), the content of which is incorporated herein by reference in its entirety as if fully set forth herein.

FIELD OF THE INVENTION

The invention relates to a shelf storage and retrieval system for a shelf warehouse, a shelf warehouse with a shelf storage and retrieval system of this type and to a method for storing/retrieving clothes rails in or from a shelf warehouse of this type.

BACKGROUND OF THE INVENTION

A facility for loading and unloading high shelves with hanging goods is known from EP 2 130 789 B1. A facility of this type allows the fully automatic loading and unloading of high shelves by means of a shelf storage and retrieval system having a load receiving device. A shelf storage and retrieval system of this type is complex. The space requirement needed for loading and unloading for the load receiving device is high.

Further shelf storage and retrieval systems are known from DE 297 15 506 U1 and DE 10 2007 013 863 A1.

SUMMARY OF THE INVENTION

An object of the present invention is to improve a shelf storage and retrieval system for a shelf warehouse in such a way that a shelf storage and retrieval system with a load receiving device is simplified.

This object is achieved according to the invention by a shelf storage and retrieval system for a shelf warehouse, wherein the shelf storage and retrieval system can be moved along a transport direction and comprises a load receiving device with a transfer device that can be moved along a transfer direction to transfer clothes rails and a plurality of vertically movable lifting mechanisms arranged on the transfer device for lifting a respective clothes rail from below.

According to the invention, it was recognized that the structural outlay for a load receiving device is reduced if vertically movable lifting mechanisms are used for lifting and/or lowering a respective clothes rail from below. Compared to a gripping mechanism known from EP 2 130 789 B1, the load receiving device of the shelf storage and retrieval system according to the invention allows lifting and carrying of clothes rails from a region below the clothes rails. It is, therefore, in particular, unnecessary for a shelf, that is being attended to by the shelf storage and retrieval system according to the invention to provide additional free space above the clothes rails. The shelf storage and retrieval system according to the invention allows a more compact, denser arrangement of clothes rails in a shelf. The goods density and/or storage density in a shelf of this type is increased. Since the lifting mechanisms themselves can be vertically moved, the load receiving device can remain vertically fixed during the storage and retrieval of clothes rails. The structural outlay and that for apparatus for the load receiving device are reduced. The load receiving device itself is advantageously movable along a height direction, in other words vertically. Using the shelf storage and retrieval system according to the invention, shelves, in which clothes rails are arranged one above the other in various planes, so-called shelf layers, can be handled. In particular, the shelf storage and retrieval system is suitable for a high shelf warehouse. The shelf storage and retrieval system can be moved along a transport direction that is, in particular, horizontally oriented. The load receiving device has a transfer device that can be moved along a transfer direction. The transfer direction is, in particular, horizontally oriented. The transfer direction is, in particular oriented perpendicular to the transport direction. The transfer device is used for transferring the clothes rails from the shelf storage and retrieval system into the shelf. By transferring the clothes rails, these are stored or retrieved. In particular, three lifting mechanisms are provided on the transfer device. The lifting mechanisms are arranged next to one another and, in particular, equally spaced apart, on the transfer device. In particular it is possible for shelves arranged one behind the other in the transfer direction to have shelf receivers at an identical height level. A height offset of various shelf rows, as necessary in a gripping mechanism gripping from above according to EP 2 130 789 B1, can be dispensed with in the shelf storage and retrieval system according to the invention. The shelf warehouse can, overall, be constructed with an improved regularity. In particular, the use of more identical parts is produced thereby. The manufacturing and assembly of a shelf warehouse of this type are simplified. The operation of the shelf warehouse is simplified and therefore less susceptible to faults.

A shelf storage and retrieval system is advantageous, in which the lifting mechanisms can be moved individually, independently of one another. Depending on the design of the shelf warehouse, for example, an empty clothes rail can firstly be removed and a full clothes rail then placed in the warehouse. The order can also be reversed. Because of the possibility of the independent actuation of the lifting mechanisms, an increased flexibility is produced in the storage and retrieval of clothes rails. In particular, it is possible to store a first clothes rail with a first lifting mechanism and to retrieve a second clothes rail with a second lifting mechanism substantially at the same time. This means that the storage and retrieval of a plurality of clothes rails can take place effectively with respect to time in one work sequence.

A shelf storage and retrieval system is advantageous, in which the lifting mechanisms can be moved between a lower transport position and an upper loading/unloading position. The lifting mechanisms can be constructed in an uncomplicated manner, wherein a monitoring of the lower transport positions and the upper loading/unloading position can take place in a manner assisted by the end positions. In particular, the moving of the lifting mechanisms takes place in a path-controlled manner. A path-controlled movement between two end positions can be implemented in an uncomplicated manner. At the same time, a path-control ensures a reliable mode of operation. The lifting mechanisms are not susceptible to faults. In addition or alternatively, the lifting mechanisms can also be moved in a force-controlled manner. An overload situation can, for example, be avoided by means of a force control. An overload situation can occur in the event of a collision or with overloading of the clothes rail.

A shelf storage and retrieval system with a lifting drive for moving the lifting mechanism is advantageous. The lifting drive is, in particular, configured as an electric motor. Alternatively, pneumatic and/or hydraulic lifting drives may also be provided. The electric motor lifting drive allows a rapid, precise and, in particular, stepless movement between two end positions.

A shelf storage and retrieval system is advantageous, in which a lifting mechanism has two lifting elements, which are, in each case, provided to lift one end of a clothes rail. A clothes rail can be lifted in a reliable and defined manner by means of the two lifting elements. A lifting mechanism of this type is constructed in a safe and uncomplicated manner.

It is particularly advantageous if a lifting element has a respective lifting receiver, which is, in particular, configured as a V-shaped indentation. A reliable depositing of the clothes rail in the lifting receiver of the lifting element is thereby additionally improved. An unintentional release of a clothes rail from the lifting receiver is ruled out. A reliable displacement of the clothes rail along the transfer device and/or along the vertical height direction is guaranteed by means of the lifting mechanism. The V-shaped indentation has a centering effect for the clothes rail. In particular, the V-shaped indentation is self-locking as a result of the gravitational force of the clothes rails during the transport of the clothes rail. A V-shaped indentation can be produced in a structurally uncomplicated manner.

A shelf storage and retrieval system with a transfer slide as the transfer device is advantageous. The transfer slide has a frame that is telescopic along the transfer direction. The transfer slide is robust and space-saving. The transfer slide allows an effective accessibility of the shelf.

A further object of the present invention is to provide a shelf warehouse, which is constructed in a simplified manner and, in particular, allows an increased storage density.

This object is achieved according to the invention by a shelf warehouse comprising at least one shelf and a shelf storage and retrieval system, which can be moved along a transport direction toward the shelf and away from the shelf, according to the invention.

It was recognized according to the invention that a shelf warehouse has at least one shelf storage and retrieval system according to the invention, which can be moved along a transport direction toward a shelf and away from a shelf. In particular, the shelf warehouse has a loading/unloading station. The shelf storage and retrieval system can be movable between the loading/unloading station and the at least one shelf. The shelf is, in particular, a high shelf, which has a plurality of shelf layers spaced apart vertically with respect to one another. Goods, in particular hanging goods, can be stored in each shelf layer. This means that hanging goods can be stored one above the other in various planes in a high shelf with a plurality of shelf layers. It is advantageous if a plurality of clothes rails can be arranged in one shelf layer. The goods density and therefore the storage capacity are increased thereby. The advantages of the shelf warehouse coincide with those which have already been described with the aid of the use of the shelf storage and retrieval system according to the invention, to which reference is hereby made. It is essential that the shelf warehouse according to the invention allows an increased storage density. The shelf warehouse according to the invention is, overall, extended with an improved regularity. The structural outlay, in particular an outlay for manufacturing and/or assembling the warehouse, is simplified. The handling of the shelf warehouse is simplified as in particular various height levels of adjacent storage rows can be dispensed with. In particular, a plurality of shelves are arranged one behind the other along the transfer direction. The shelves are, in particular, identical. In particular, the shelf receivers of the shelves are at an identical height level in each case.

A shelf warehouse is advantageous, in which a lifting mechanism spacing oriented along the transfer direction between two adjacent lifting mechanisms is smaller than a shelf receiver spacing oriented along the transfer direction between two adjacent shelf receivers of the shelf. The transfer device and the lifting mechanisms can be advantageously flexibly arranged between the shelf receivers with respect to a vertical orientation. In particular it is possible for a first lifting mechanism to be able to be arranged aligning vertically with a first shelf receiver and a second lifting mechanism to be arranged non-aligning vertically with a second shelf receiver. It is conceivable for the lifting mechanism spacing to be greater than the shelf receiver spacing. It is important for the lifting mechanism spacing and the shelf receiver spacing to differ. The difference in particular, has to be selected in such a way that with a vertically aligning arrangement of the first lifting mechanism and the first shelf receiver, the second lifting mechanism can be moved vertically without an interaction taking place with the second shelf receiver. In particular, a minimum difference between the lifting mechanism spacing and shelf receiver spacing corresponds approximately to a diameter of a clothes rail, in particular to at least 1.5 times and, in particular, at least twice the diameter of the clothes rail.

A shelf warehouse is advantageous, in which a width of the transfer slide oriented along the transport direction is greater than a shelf receiver width oriented along the transport direction between two adjacent shelf receivers of the shelf for common receiving of a clothes rail. The width of the transfer slide defines the spacing between two lifting elements of a lifting mechanism.

A clothes rail deposited in the shelf receivers of the shelf is received in that the lifting mechanisms grip the clothes rail, in each case, at an outer end, in particular behind the shelf receivers. As a result, the length of the clothes rail between the clothes receivers can be used completely as a receiving face for clothes hangers. The utilization of each individual clothes rail is increased. The handling of the clothes rail by means of the load receiving device is simplified.

A clothes warehouse, in which the shelf has two vertical columns spaced apart along the transport direction, is advantageous. At least two shelf receivers are provided, in each case, at each vertical column. The shelf receivers in each case face, along the transport direction, in particular the respective other vertical column of the shelf. The shelf receivers are arranged spaced apart, in particular with respect to the vertical column, on which they are fastened. As a result it is possible to engage behind a clothes rail arranged in the shelf receiver. The gripping behind process takes place in an intermediate space between the shelf receiver and the associated vertical column.

It is particularly advantageous if the shelf receivers are in each case arranged on a separate spacer lever. The spacer levers are, in particular, L-shaped. The spacer levers are arranged spaced apart from one another along the transfer direction. Because of the spaced arrangement of the L-shaped spacer levers along the transfer direction, a free region is produced as an interruption between the shelf receivers in the transfer direction. As a result, a flexible movement of the lifting mechanisms is made possible in the region of the shelf. In particular, a vertical movement of a lifting mechanism occupied by a clothes rail is simplified by the free region.

A further object of the present invention is to simplify a method for storing/retrieving clothes rails in or from a shelf warehouse.

This object is achieved according to the invention by a method for storing/retrieving clothes rails in or from a shelf warehouse according to the invention, comprising the method steps: moving a shelf storage and retrieval system equipped with a clothes rail to be stored according to the invention along a transport direction into a storage/retrieval position on a shelf, moving a transfer device equipped with the clothes rail to be stored along a transfer direction into a first transfer position on the shelf, vertically moving at least two lifting mechanisms, wherein one of the at least two lifting mechanisms is occupied by the clothes rail to be stored and the other lifting mechanism is unoccupied to receive a clothes rail to be retrieved, removing the clothes rail to be retrieved with the unoccupied lifting mechanism out of a first shelf receiver of the shelf, depositing the clothes rail to be stored with the occupied lifting mechanism in a second shelf receiver of the shelf, moving the transfer device occupied by the clothes rail to be retrieved along the transfer direction into a storage/retrieval position on the shelf, moving the shelf storage and retrieval system equipped with the clothes rail to be retrieved along the transport direction.

According to the invention, it was recognized that a storage/retrieval of clothes rails is simplified in that clothes rails are lifted from below by means of a shelf storage and retrieval system according to the invention. The depositing and removal of clothes rails in the shelf or from the shelf is simplified. The storage/retrieval of clothes rails is possible in a rapid and efficient manner. The access time to stored articles is shortened. In the method according to the invention, a movement takes place of a shelf storage and retrieval system equipped with a clothes rail, which is to be stored and is, in particular, loaded with clothing items that have been hung up. The shelf storage and retrieval system is moved along a transport direction into a, in particular, horizontal, storage/retrieval position on the shelf. The transport direction is oriented, in particular, parallel to the clothes rails stored on the shelf. The transfer device is then moved along a transfer direction into an, in particular, horizontal first transfer position on the shelf. The transfer device is occupied by the clothes rail to be stored. In the first transfer position, a vertical movement takes place, in other words upwardly, by at least two lifting mechanisms. One of the at least two lifting mechanisms is occupied by the clothes rail to be stored. A removal of an, in particular, empty and unequipped clothes rail to be retrieved takes place from the shelf receivers with the unoccupied lifting mechanism. In addition, the clothes rail to be stored is deposited by means of the occupied lifting mechanism on shelf receivers, which, in particular, differ from the shelf receivers, from which the clothes rail to be retrieved had previously been removed. In particular, it is also conceivable for the clothes rail to be stored to initially be placed and a clothes rail to be retrieved to then be removed. In particular, however, it is advantageous if an exchange of clothes rails, in other words the depositing of a clothes rail to be stored and the removal of a clothes rail to be retrieved, takes place in one operation, in other words, in particular without a complete retraction and extension of the transfer device along the transfer direction being necessary. The transfer times are thereby reduced. The method can, in particular, be applied rapidly and effectively. After the exchange of the clothes rails, the lifting mechanisms are moved vertical downwardly into the horizontal transfer position. Thereafter, the transfer device occupied by the clothes rail to be retrieved is moved along the transfer direction into the storage/retrieval position. The shelf storage and retrieval system occupied by the clothes rail to be retrieved is then moved along the transport direction, in particular to the loading/unloading station. The clothes rail to be retrieved can then be retrieved from the shelf storage and retrieval system at the loading/unloading station.

A method is advantageous when, after the removal of the clothes rail to be retrieved from the shelf, the transfer device is moved along the transfer direction into a second transfer position on the shelf. The second transfer position is fixed in such a way that the lifting mechanism occupied by the clothes rail to be stored is arranged vertically aligning with unoccupied shelf receivers of the shelf. For this purpose, the lifting mechanism is arranged in an upper loading/unloading position, in other words above the shelf receivers. In the lower transport position, the lifting mechanism is arranged below the shelf receivers. It is possible in the transport position for the shelf storage and retrieval system to be moved through under the shelf receivers.

A method is advantageous, in which the depositing of the clothes rail to be stored takes place by means of vertical lowering of the occupied lifting mechanism. The depositing of the clothes rail to be stored is possible in a simple and uncomplicated manner.

An embodiment of the invention will be described in more detail below with the aid of the drawings.

DESCRIPTION OF THE PREFERRED EMBODIMENT

Figure 1:
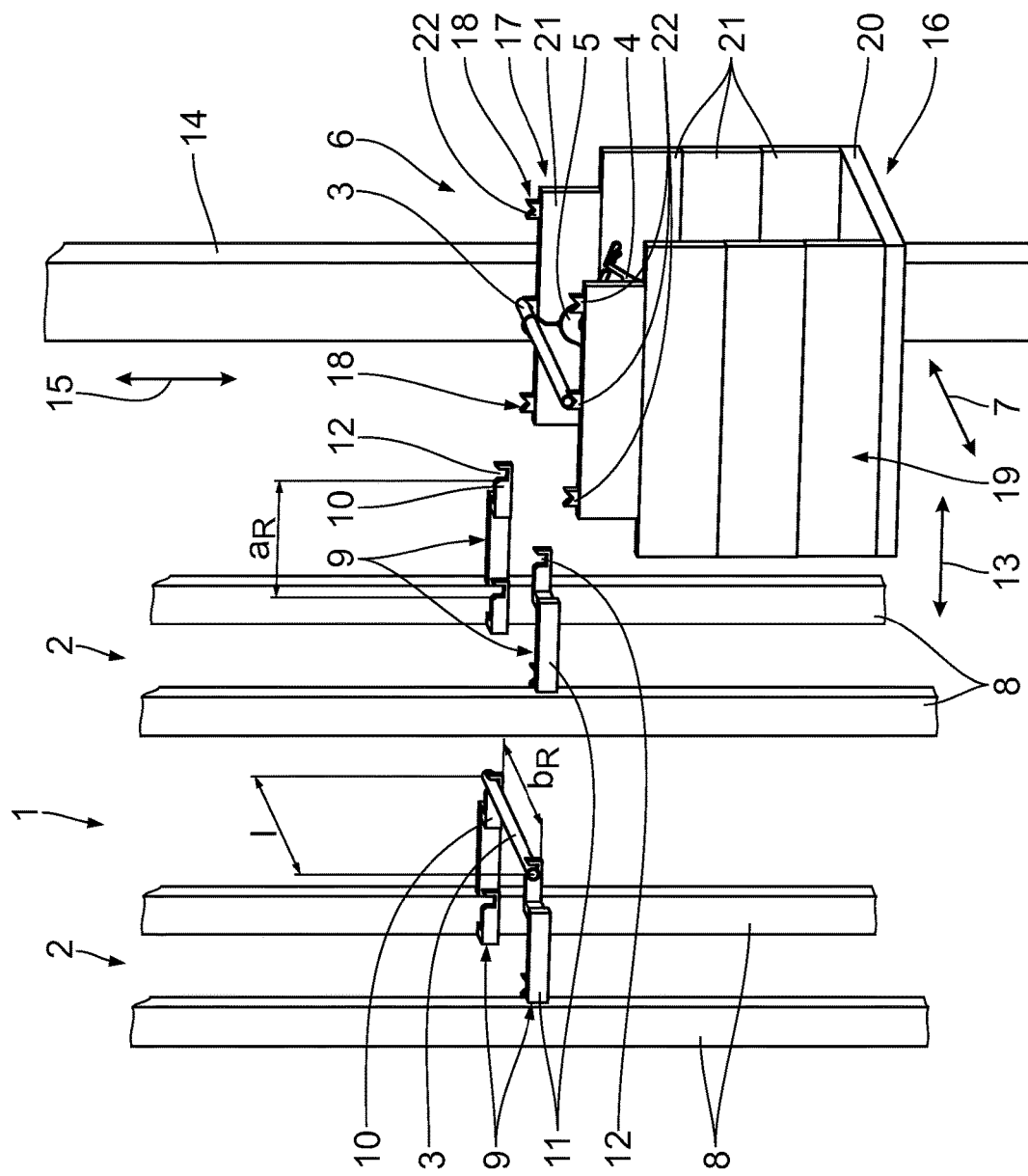
FIG. 1 shows a perspective view of a shelf storage and retrieval system according to the invention in a shelf warehouse in a storage/retrieval position.
Figure 2:
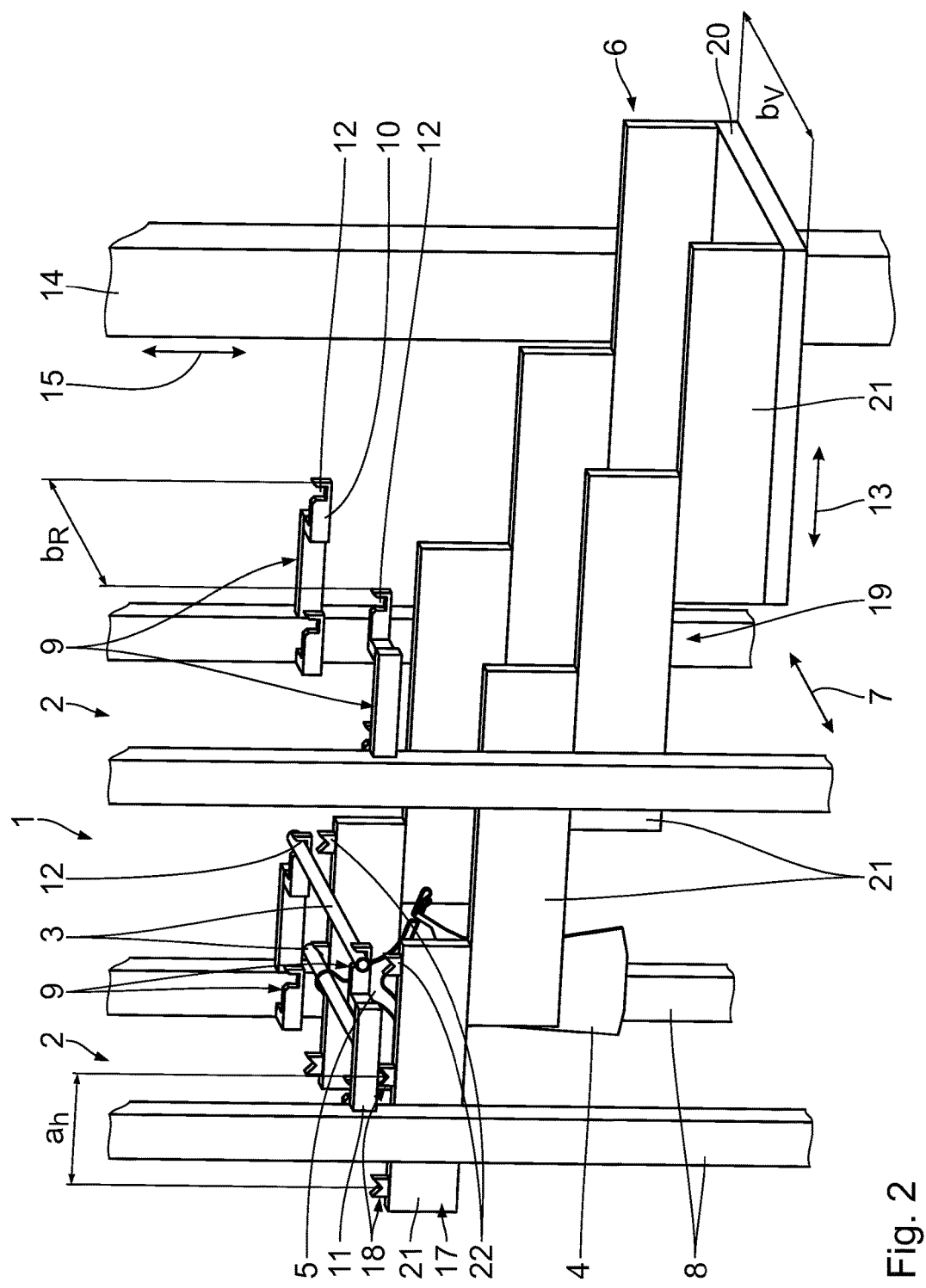
FIG. 2 shows a view corresponding to FIG. 1 in a first transfer position of the shelf storage and retrieval system.
Figure 3:
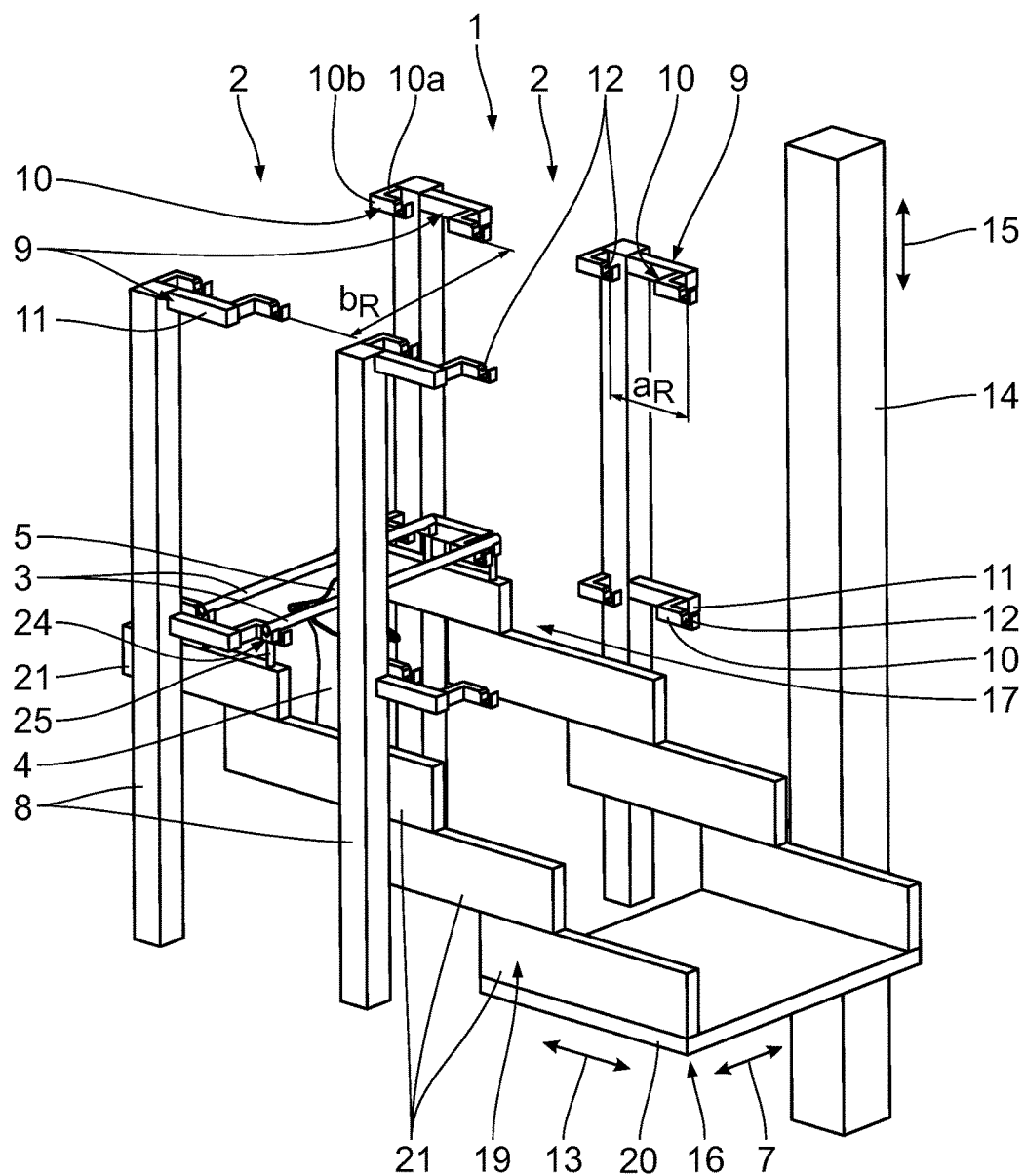
FIG. 3 shows a perspective review corresponding to FIG. 2 with the shelf storage and retrieval system, in which two lifting mechanisms are arranged in an upper loading/unloading position.
Figure 4:
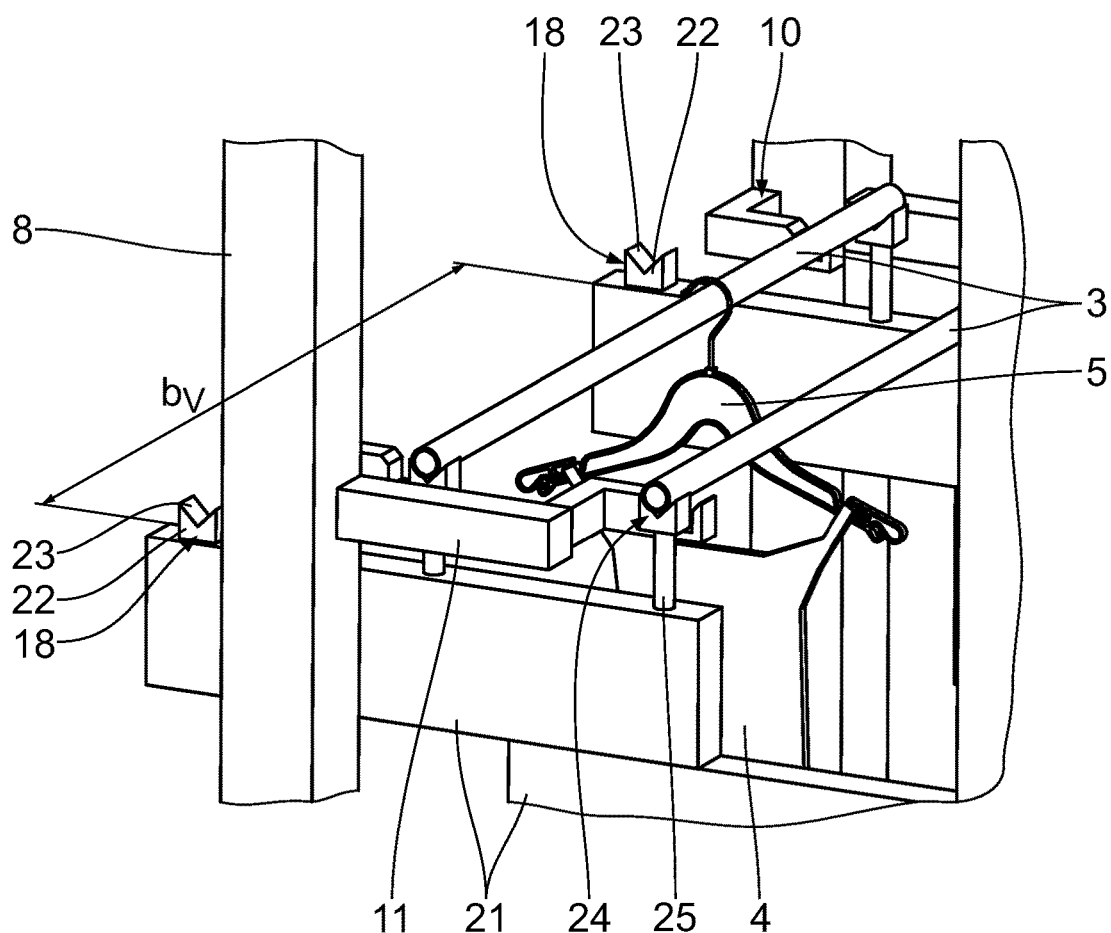
FIG. 4 shows an enlarged detailed cutout of the lifting mechanisms according to FIG. 3.

FIGS. 1 to 6 show cutout-wise a shelf warehouse, as known per se, from EP 2 130 789 B1. The shelf warehouse 1 has a plurality of shelves 2, which are configured as high shelves. This means that the shelves 2 can receive goods 4 in various planes arranged spaced apart from one another in a vertical direction, so-called shelf layers. The shelf warehouse 1 is a high shelf warehouse. The shelves 2 are used to receive clothes rails 3, on which clothing items 4 can be stored hanging by means of a clothes hanger 5. The shelves 2 are basically suitable to store hanging goods. For graphic reasons, only two shelves 2 are shown in FIG. 1, which are arranged spaced apart from one another in a direction perpendicular to a longitudinal axis of the clothes rails 3, in other words one behind the other. It is, in particular, possible to arrange a plurality of shelves 2 next to one another along the axis of the clothes rail 3.

The shelf warehouse furthermore comprises a shelf storage and retrieval system 6 for attending to the shelves 2. The shelf storage and retrieval system 6 enables the shelf storage and retrieval of the clothes rails 3 in the shelves 2. The shelf warehouse 1 furthermore comprises a loading/unloading station, not shown. Generally, the shelf storage and retrieval system 6 takes a clothes rail 3 equipped with clothing 4 from the loading/unloading station. The clothes rail 3 equipped with clothing 4 is stored in one of the shelves 2. Empty clothes rails 3, in other words those not equipped with clothing, are taken from the shelf 2 by means of the shelf storage and retrieval system 6 and retrieved at the loading/unloading station.

The shelf storage and retrieval system 6 can be moved between the loading/unloading station and the shelves 2 along a transport direction 7. The transport direction 7 is oriented parallel to a longitudinal axis of the clothes rails 3 in particular in the region of the shelves 2. Depending on the arrangement of the shelves 2 in the shelf warehouse 1, the transport direction may be non-linear, at least in portions. It is advantageous if the transport direction is substantially linear.

A plurality of shelves 2 arranged next to one another along the transport direction 7 form a row of shelves. According to the embodiment shown, the shelf warehouse 1 is in two rows, as two shelves 2 are arranged spaced apart from one another in a direction perpendicular to the transport direction 7, in other words one behind the other with respect to the transport direction 7. It is possible to provide further rows of shelves, which are arranged opposing the rows of shelves shown in FIG. 1 at the shelf storage and retrieval system 6. A free space remaining between the opposing rows of shelves is a travelling lane for the shelf storage and retrieval system. The shelf storage and retrieval system 6 can advantageously handle all the shelves 2 from the travelling lane.

To move along the transport direction 7, the shelf storage and retrieval system 6 has a drive, not shown. The drive is, in particular, configured as an electric motor. Other drive concepts are also conceivable.

It is advantageous if all the shelves 2 in the shelf warehouse 1 are identically configured.

The shelf 2 has two vertical columns 8 spaced apart along the transport direction 7. Two shelf receivers 9 are respectively arranged on the vertical columns 8. The shelf receivers 9 are in each case configured as L-shaped spacer levers 10, a first, shorter side 10*a* of the L extending along the transport direction 7 of the respective other vertical column 8 of the shelf. A second, longer side 10*b* of the spacer lever 10 extends perpendicular to the transport direction 7 of the travelling lane, in other words in the direction of the shelf storage and retrieval system 6 from the vertical columns 8. A respective spacer lever 10 is directly fastened to the vertical column 8. The respective other spacer lever 10 is fastened by means of a spacer lever 11 to the vertical column 8.

The second, longer side 10*b* of the spacer lever 10 has an upwardly open, substantially rectangular receiver 12. The receiver 12 has, at the upwardly open edge, introduction bevels, which facilitate the introduction of a clothes rail 3 into the receiver 12. The receivers 12 are in each case configured in such a way that the clothes rail 3 is safely and reliably held in the receiver 12 in the region of a respective end of the clothes rail 3. In particular, an edge length of the receiver 12 is at least as large as the diameter of the clothes rail 3.

The shelf receivers 9 are arranged spaced apart along the transport direction 7, in particular by the first, shorter side 10*a*, with respect to the vertical column 8, on which they are respectively fastened. The two shelf receivers 9 of a vertical column 8 are arranged spaced apart in a direction perpendicular to the transport direction 7. The direction perpendicular to the transport direction 7 is called the transfer direction 13. The shelf receiver spacing $a_R$ designates the spacing between two adjacent shelf receivers 9 of a vertical column 8 along the transfer direction 13. A shelf receiver width $b_R$ is the spacing between two shelf receivers 9 of a shelf 2 arranged spaced apart along the transport direction 7. The shelf receiver width $b_R$ is smaller than a length l of a clothes rail 3. This means that the clothes rail 3, which is deposited in two shelf receivers 9 of a shelf, projects at the shelf receivers 9 along the transport direction 7. To horizontally deposit a clothes rail 3, two respective corresponding shelf receivers 9 are arranged in an identical height position on a respective vertical column 8.

Furthermore, the two shelf receivers 9 fastened on a vertical column 8, in each case, are arranged in the same height position. This means that two clothes rails 3 can be deposited in a shelf layer at an identical height level, in other words in the same height position, in the shelf 2. There is no height difference between the shelf receivers 9 in a shelf layer on the shelf 2. As the shelves 2 are, in particular, identically configured, the shelf receivers 9 of the various shelves 2 are in each case located in an identical height position. A plurality of shelf layers are arranged in a high shelf warehouse, in particular uniformly, vertically spaced apart from one another.

The shelf storage and retrieval system 6 comprises a load receiving device 16 that can be moved vertically on a lift guide 14, in other words along a height direction 15. The height direction 15 is, in particular, arranged perpendicular to a plane spanned by the transport direction 7 and the transfer direction 13.

The load receiving device 16 has a transfer device 17, which is used to transfer the clothes rails 3 to the shelf 2. The transfer device 17 can be moved along transfer direction 13. Three lifting mechanisms 18 that can be moved along the height direction 15, in other words vertically, are arranged on the transfer device 17. The lifting mechanisms 18 can be activated individually, in other words moved, independently of one another. For this purpose, an electric motor-driven, a pneumatic or a hydraulic lifting drive, which is not shown, may be provided. A plurality of lifting drives are also possible.

The transfer device 17 is configured as a transfer slide, which has a frame 19 that is telescopic along the transfer direction 13. According to the embodiment shown, the telescopic frame 19 comprises a horizontally oriented base plate 20. The base plate 20 has a rectangular basic shape. Four side wall elements 21 arranged above one another are arranged, in each case, on the two edges of the base plate oriented along the transfer direction 13. The side wall elements 21 are connected to one another at the end face and can be displaced with respect to one another, guided along the transfer direction 13. For this purpose, a linear guide unit, not shown, may be provided in each case at the end face of the side wall elements 21. FIG. 1 shows the telescopic frame in a retracted arrangement. In this arrangement, the side wall elements 21 of the frame 19 are arranged aligned one above the other. In a telescopically extended arrangement of the frame 19 according to FIG. 2, the side wall elements 21 are extended along the transfer direction 13. The lowermost side wall element 21 is rigidly connected to the base plate 20. The side wall elements 21 arranged thereabove in each case are extended.

The lifting mechanisms 18 are arranged on an upper side of the transfer device 17. According to the embodiment shown, the lifting mechanisms 18 are arranged on an upper end face of the uppermost side wall element 21.

Along the transfer direction 13, the lifting mechanisms 18 are arranged spaced apart from one another. In particular, the respective spacing between two adjacent lifting mechanisms is identical. A lifting mechanism spacing $a_h$ provided between two spaced-apart lifting mechanisms 18 is smaller than the shelf receiver spacing $a_R$. It is important that the lifting mechanism spacing $a_h$ is different from the shelf receiver spacing $a_R$.

The width of the frame 19 of the transfer device 17 along the transport direction 7 is provided by the base plate 20.

Each lifting mechanism 18 has two corresponding lifting elements 22. The corresponding lifting elements 22 are identically configured. The lifting elements 22 are spaced apart along the transport direction 7, in particular by a spacing $b_V$. The spacing $b_V$ corresponds to a width of the transfer device 17 oriented along the transport direction 7. The lifting elements 22 are provided to lift a free end of a clothes rail 3 from below. For this purpose, each lifting element 22 has a lifting receiver 23. The lifting receiver 23 is configured as a V-shaped, upwardly open indentation. Owing to the V-shaped configuration of the lifting receiver 23, a safe depositing of a clothes rail 3, in particular upon a displacement of the transfer device along the transfer direction 13, is guaranteed. The V-shaped indentation has a self-centering effect. Because of the gravitational force of the clothes rail 3 and clothing 4 possibly fastened thereto, the lifting receiver 23 acts in a self-locking manner. The production of the lifting receiver 23 is structurally uncomplicated. The lifting receiver 23 is part of a rail head 24, which is fastened to an upper end of a lifting rail 25. The lifting elements 22 can be vertically displaced along the height direction 15 by means of the lifting rod 25, which is arranged vertical guided in the side wall element 21 of the frame 19.

The spacing $b_V$ between two corresponding lift elements 22 is greater than the shelf receiver width $b_R$. The spacing $b_V$ substantially corresponds to the length 1 of a clothes rail 3. This means that the clothes rail 3 terminates substantially flush with the lifting elements 22 in relation to the transport direction 7. In particular, the clothes rail 3 does not project at the lifting elements 22 along the transport direction 7.

Figure 5:
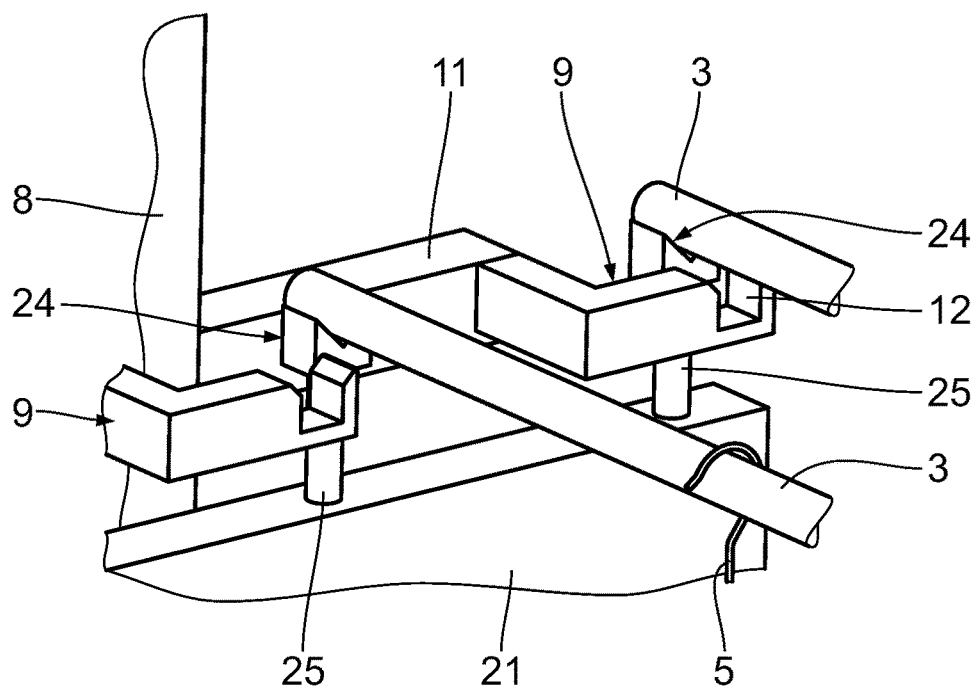
FIG. 5 shows an enlarged detailed view corresponding to FIG. 4 according to a differing viewing angle.

The length of the lifting rail 25 along the height direction 15 is selected such that a clothes rail 3 can be lifted from the receiver 12 of the shelf receiver 9. In a maximally extended height position, the loading/unloading position, of the lifting elements 22, the lifting rail 3 is arranged vertically, upwardly, spaced apart from the shelf receivers, in particular from the spacer levers 10, as shown in FIG. 5.

Figure 6:
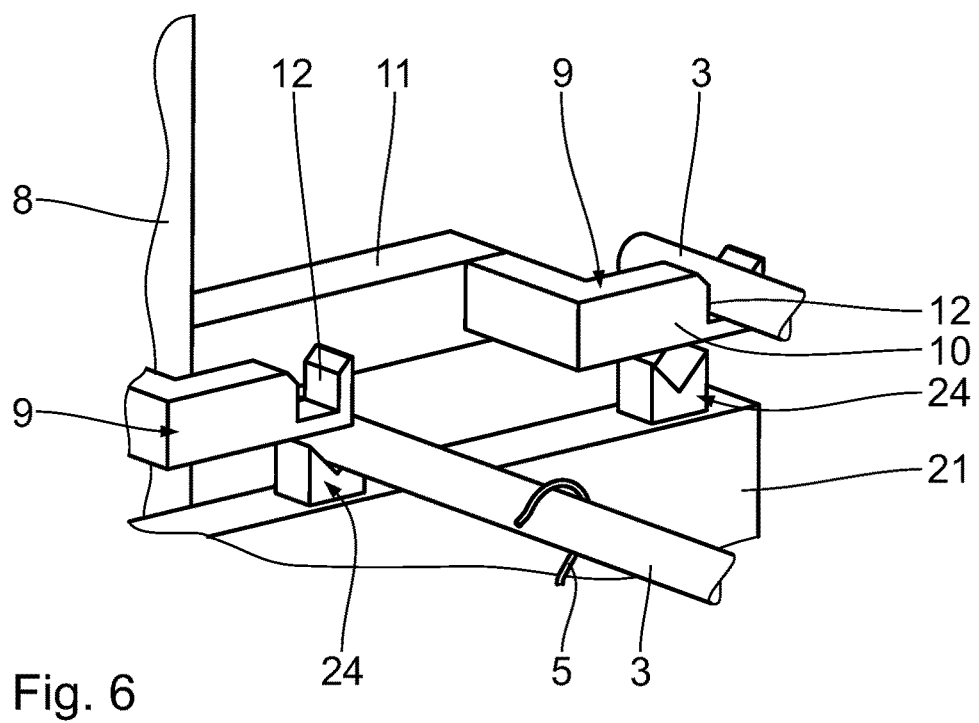
FIG. 6 shows a view corresponding to FIG. 5 with the lifting mechanisms in the lower transport position.

In the maximally retracted position of the lifting elements 22, the transport position, the rail head 24 rests on the upper end face of the uppermost side wall element 21 of the frame 19 of the transfer device 17. The rail head 24 with the lifting receiver 23 arranged therein is arranged vertically, downwardly, in the maximally retracted state according to FIG. 6 by the spacer levers 10 of the shelf receivers 9 in such a way that it is possible for the transfer device 17 to move through along the transfer direction 13 below a shelf receiver. In particular, the spacing between an upper edge of the lifting element 22 and a lower edge of the spacer lever 10 of the shelf receiver 9 in the maximally retracted position of the lifting elements 22 according to FIG. 6 is approximately the diameter of the clothes rail 3.

The storage and retrieval of clothes rails in the shelf 2 and from the shelf 2 will be described in more detail below with aid of FIGS. 7 to 27. The views according to FIGS. 7 to 27 are side views. The drawing plane is oriented perpendicular to the transport direction 7. This means that the drawing plane is parallel to a plane, which is spanned by the transfer direction 13 and the height direction 15. On the right in the image, in each case, the travelling lane is shown, along which the shelf storage and retrieval system 6 can be moved perpendicular to the plane of the drawing. Shown on the left in each case are two identical shelves 2, which are arranged one behind the other spaced apart from one another along the transfer direction 13. The shelves 2 are identical in each case. Each shelf has two shelf layers.

For the sake of clear illustration, the side views according to FIGS. 7 to 27 are shown highly schematically, in other words simplified. In particular, the vertical columns 8 of the shelves are not shown. The shelf receivers 9 are shown as U-shaped indentations.

Figure 7:
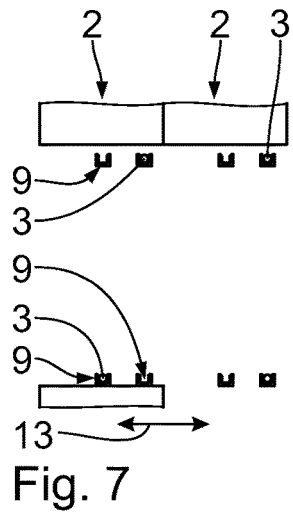
FIGS. 7 to 27 show schematic side views of a stage sequence for storage/retrieval of clothes rails in or from a shelf warehouse by means of a shelf storage and retrieval system according to the invention.
Figure 8:
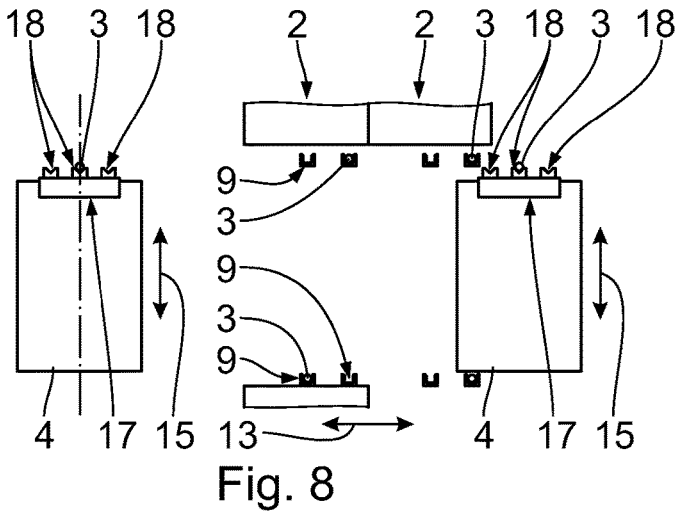
Figure 9:
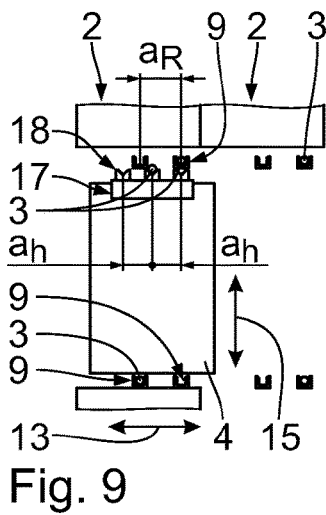

The shelf storage and retrieval system 6 firstly removes a clothes rail 3 equipped with clothing items 4 from a loading/unloading station, not shown. The clothes rail 3 removed from the loading/unloading station with clothing 4 hanging thereon is received on the central lifting mechanism 18 arranged along the transfer direction 13. The two outer lifting mechanisms 18 are free, in other words do not carry a clothes rail 3. The shelf storage and retrieval system 6 then travels with the clothes rail 3 loaded with clothing items 4 and to be stored in the shelf 2 along the transport direction 7 into a storage/retrieval position on the shelf 2. The storage/retrieval position is oriented horizontally. This situation is shown in FIG. 7. The transfer device 17 then moves along the transfer direction 13 into a horizontal transfer position. The transfer device 17 is configured in such a way that the transfer slide with the lifting mechanisms 18 and clothes rails 3 possibly deposited therein can be transported through between two shelf layers of a shelf 2 arranged spaced apart along the height direction 15. The transfer position on the shelf 2 is shown in FIG. 9. According to the embodiment shown, the shelf 2 facing away from the travelling lane is firstly loaded.

During the movement of the shelf storage and retrieval system 6 and in particular of the transfer device 17, the lifting mechanisms 18 are in a retracted position. The lifting mechanisms 18 are thus in a lower transport position.

Figure 10:
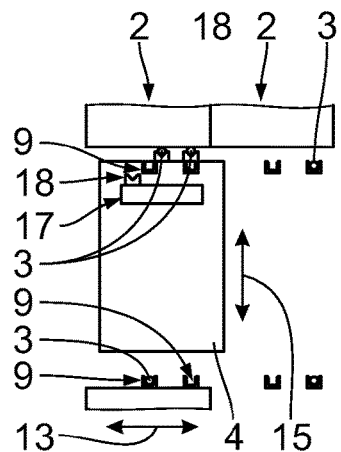

According to FIG. 9, the transfer position of the transfer device 17 on the shelf 2 is reached when the lifting mechanism 18 shown on the right is arranged below the right-hand shelf receiver 9 of the shelf 2. An empty, unequipped clothes rail 3 is arranged in the right-hand shelf receiver 9. In particular, it emerges directly from FIG. 9 that the lifting mechanism spacing $a_h$ between two adjacent lifting mechanisms 18 is smaller than the shelf receiver spacing $a_R$ between two adjacent shelf receivers 9 of a shelf layer of the shelf 2. Proceeding from the transfer position in FIG. 9, two lifting mechanism, namely the lifting mechanism 18 arranged vertically aligning below the right-hand shelf receiver 9 and the central lifting mechanism 18, which carries the equipped clothes rail 3, travel vertical upwardly until a maximally extended position, an upper loading/unloading position, has been reached. This arrangement is shown in FIG. 10. The lifting mechanism 18 shown on the left in FIG. 10 is not moved vertically in this method step, in other words remains in the lower transport position.

Since the shelf receivers 9 are in each case arranged spaced apart from the vertical columns 8 along the transport direction 7, a lifting element 22 of a lifting mechanism 18 can move without a collision in an intermediate space between the shelf receiver 9 and the vertical column 8 in the vertical direction. Since the lifting mechanism 18 shown on the right in FIG. 9 is arranged vertically aligning below the shelf receiver 9, owing to the vertical movement upwardly into the upper loading/unloading position, the empty, unequipped clothes rail 3 is lifted from the corresponding shelf receiver 9 (FIG. 10). This means that two lifting mechanisms 18 are now arranged in the upper loading/unloading position, in other words above the shelf receivers 9, and the third lifting mechanism 18 shown on the left in FIG. 10 is arranged in the transport position below the shelf receivers 9.

Figure 11:
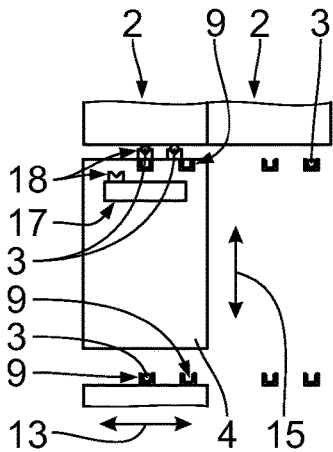

In this arrangement, the transfer device 17 moves along the transfer direction 13 to the left until the central lifting mechanism 18, in which the clothes rail 3 equipped with clothing 4 is held, is arranged vertically aligning above the left-hand shelf receiver 9 of the shelf 2 (FIG. 11). The path distance along the transfer direction 13 from the arrangement in FIG. 10 to the arrangement in FIG. 11 corresponds to the difference between the shelf receiver spacing $a_R$ and the lifting mechanism spacing $a_h$.

Figure 12:
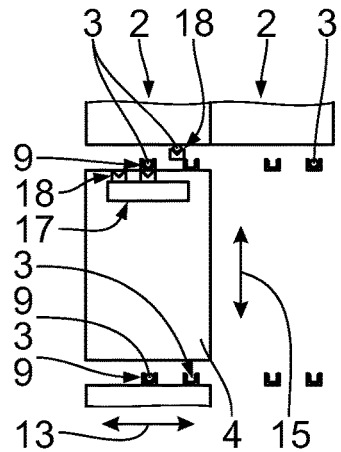
Figure 13:
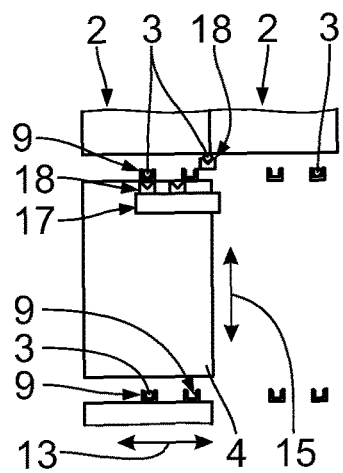
Figure 14:
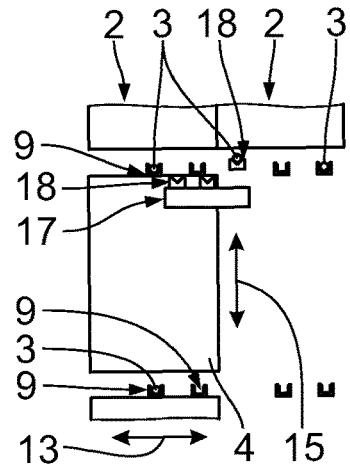
Figure 15:
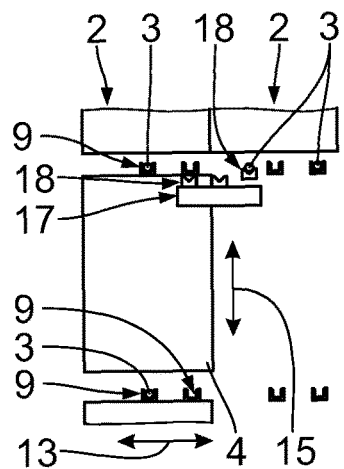
Figure 16:
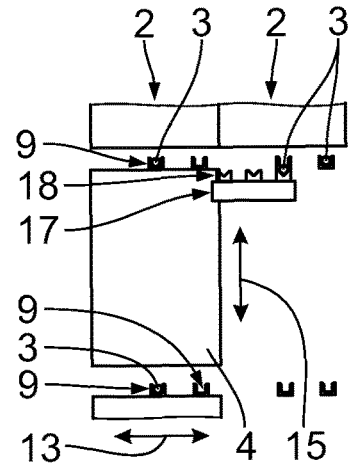

Proceeding from the vertically aligning arrangement in FIG. 11, the central lifting mechanism 18 is retracted vertically downwardly into the transport position (FIG. 12). By means of the vertical lowering and the vertically aligning arrangement, the clothes rail 3 equipped with clothing 4 is automatically deposited in the rear shelf receiver 9 of the shelf 2 shown on the left in FIG. 12 and facing away from the travelling lane. The lifting mechanism 18 shown on the right in FIG. 12 remains in the maximally extended upper loading/unloading position to avoid a collision with the clothing 4. The transfer device 17 then moves along the transfer direction 13 back in the direction of the travelling lane.

As soon as a potential collision region is left along the transfer direction 13, the lifting mechanism 18 carrying the empty clothes rail 3 can be lowered vertically along the height direction 15 and moved into the lower transport position. According to the embodiment shown, the lower transport position for the lifting mechanism 18 shown on the right, in each case, in FIGS. 13 to 16, is reached at the latest when the shelf facing the travelling lane, which is shown on the right in FIG. 16, has been reached.

The lowering of the lifting mechanism 18 carrying the empty, unequipped clothes rail 3 when travelling back from the shelf 2 to the travelling lane thus takes place according to the embodiment shown in a region between the two rows of shelves. According to the embodiment shown, a superimposition of the horizontal movement of transfer device 17 along the transfer direction 13 and the vertical movement of the lifting mechanism 18 along the height direction 15 is provided here. The superimposition of these movement sequences is advantageous as they are time-effective. It is also conceivable for safety reasons to firstly carry out a movement of the transfer device 17 along the transfer direction 13 and then, in other words sequentially, to complete a vertical movement of the lifting mechanism 18 along the height direction 15.

Figure 17:
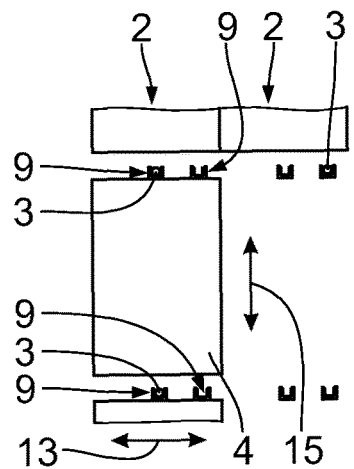
Figure 18:
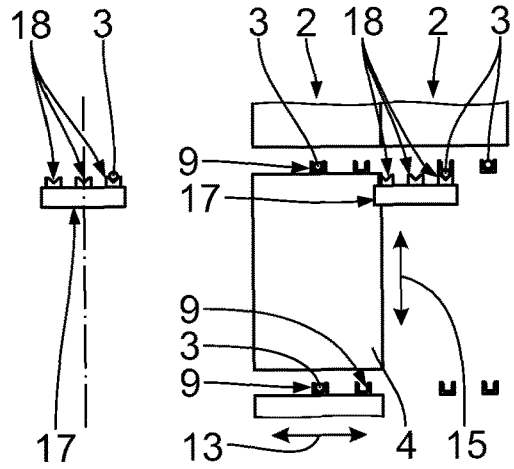
Figure 19:
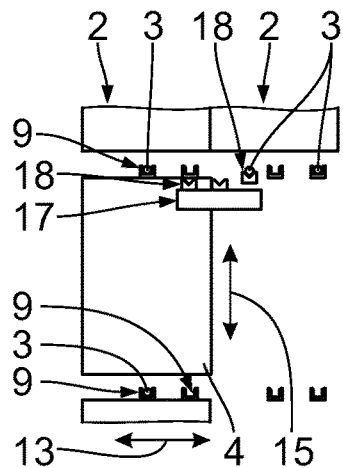
Figure 20:
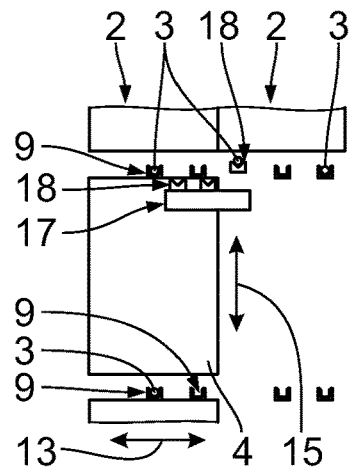
Figure 21:
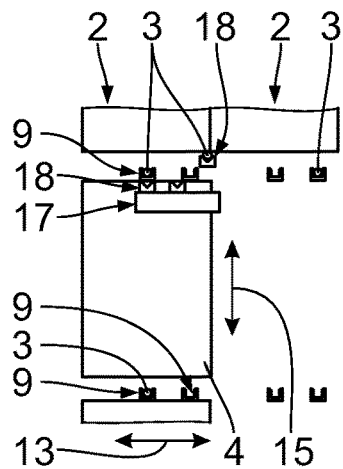
Figure 22:
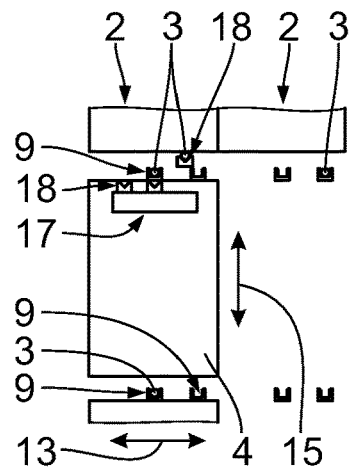
Figure 23:
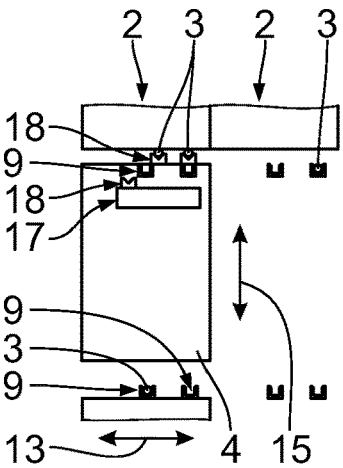
Figure 24:
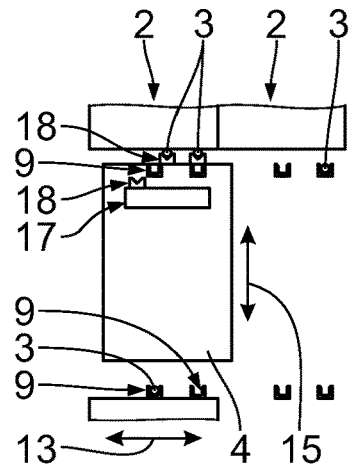
Figure 25:
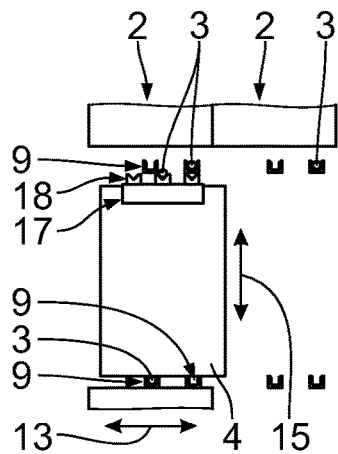
Figure 26:
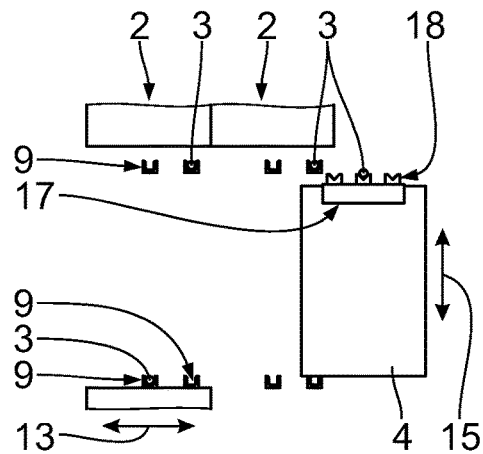
Figure 27:
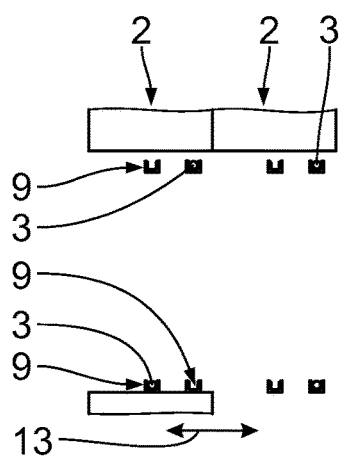

The completely moved back arrangement of the empty, unequipped transfer device 17 is shown in FIG. 17. Proceeding from the arrangement in FIG. 17, the shelf storage and retrieval system 6 with the empty, unequipped clothes rail 3 travels back to the loading/unloading station, not shown, and can unload the empty clothes rail 3 there. At the same time, a new, equipped clothes rail 3 can be received by the shelf storage and retrieval system 6 and stored in the above-described manner in the shelf 2.

A sequence for storing an empty clothes rail 3 and the simultaneous removal of an equipped clothes rail 3 to be retrieved is shown with the aid of the views in FIGS. 17 to 27. The method sequence shown in FIGS. 17 to 27 corresponds to the method sequence shown above with the aid of FIGS. 7 to 17, but in the reverse order of the method steps.

It is important that a vertical movement of the transfer device 17 is unnecessary to store and retrieve clothes rails 3 in or from the shelf 2 to allow the transfer of the clothes rails 3. The transfer device 17 and, in particular, the load receiving device 16 remain vertically fixed.

What is claimed is:

1. A shelf storage and retrieval system for a shelf warehouse (1), wherein the shelf storage and retrieval system (6)
   a. can be moved along a transport direction (7), and
   b. comprises a load receiving device (16) with
      i. a transfer device (17) that can be moved along a transfer direction (13) to transfer clothes rails (3) towards and away from a shelf (2) of the shelf warehouse, wherein the transfer direction (13) is oriented perpendicular to the transport direction (7), wherein the transport direction (7) is oriented parallel to a longitudinal axis of the clothes rails (3), and
      ii. a plurality of vertically movable lifting mechanisms (18) arranged on the transfer device (17) for lifting a respective clothes rail (3) from below,
   wherein the plurality of lifting mechanisms (18) are vertically movable relative to the transfer device (17),
   wherein the lifting mechanisms (18) are vertically movable individually and independently of one another, and
   wherein the plurality of individually and independently of one another movable lifting mechanisms (18) are arranged spaced apart from one another along the transfer direction (13) in order to provide storage and retrieval of a plurality of clothes rails effectively with respect to time in one work sequence.

2. A shelf storage and retrieval system according to claim 1, wherein the plurality of lifting mechanisms (18) can be moved between a lower transport position and an upper loading/unloading position.

3. A shelf storage and retrieval system according to claim 2, wherein the plurality of lifting mechanisms (18) can be moved between the lower transport position and the upper loading/unloading position in one of a path-controlled and a force-controlled manner.

4. A shelf storage and retrieval system according to claim 1, comprising a motor lifting drive for moving at least one of the plurality of lifting mechanisms (18).

5. A shelf storage and retrieval system according to claim 4, wherein the motor lifting drive for moving at least one of the plurality of lifting mechanisms (18) is electric.

6. A shelf storage and retrieval system according to claim 1, wherein at least one of the plurality of lifting mechanisms (18) has two lifting elements (22) for lifting the clothes rail (3) in a respective rail end region.

7. A shelf storage and retrieval system according to claim 6, wherein the lifting elements (22) in each case have a lifting receiver (23).

8. A shelf storage and retrieval system according to claim 7, wherein the lifting receiver (23) is in each case configured as a V-shaped indentation.

9. A shelf warehouse (1) comprising
   a. at least one shelf (2) and
      b. the shelf storage and retrieval system (6) of claim 1, which can be moved along the transport direction (7).

10. A shelf warehouse according to claim 9, wherein a lifting mechanism spacing ($a_{sh}$) is provided, said lifting mechanism spacing being oriented along the transfer direction (13) between two adjacent lifting mechanisms (18) and being smaller than a shelf receiver spacing ($a_R$), said shelf receiver spacing being oriented along the transfer direction (13) between two shelf receivers (9) being arranged next to each other at the shelf (2).

11. A shelf warehouse according to claim 9, wherein a width ($b_V$) of the transfer device (17) oriented along the transport direction (7) is greater than a shelf receiver width ($b_R$), said shelf receiver width being oriented along the transport direction (7) between two shelf receivers (9) being arranged next to each other at the shelf (2).

12. A shelf warehouse according to claim 9, wherein the shelf (2) has a first vertical column (8) and a second vertical column (8) spaced along the transport direction (7), wherein the first vertical column and the second vertical column each comprise at least two respective shelf receivers (9), wherein the shelf receivers (9) at the first and second vertical columns (8) are arranged spaced apart from the first and second vertical columns (8) along the transport direction (7).

13. A shelf warehouse according to claim 12, wherein a distance along the transport direction (7) between the shelf receivers (9) is smaller than a distance along the transport direction (7) between respective vertical columns (8).

14. A shelf warehouse according to claim 12, wherein the shelf receivers (9) are arranged on a respective spacer lever (10).

* * * * *